(12) United States Patent
Kobayashi et al.

(10) Patent No.: US 6,655,363 B2
(45) Date of Patent: Dec. 2, 2003

(54) FUEL SUPPLY SYSTEM FOR VEHICLE

(75) Inventors: Koki Kobayashi, Saitama (JP); Toshihiko Ichikawa, Saitama (JP); Hiroyuki Kido, Saitama (JP); Hiroshi Nakano, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/961,274

(22) Filed: Sep. 25, 2001

(65) Prior Publication Data

US 2002/0038653 A1 Apr. 4, 2002

(30) Foreign Application Priority Data

Sep. 29, 2000 (JP) .......................... 2000-299228

(51) Int. Cl.$^7$ .............................................. F02M 37/04
(52) U.S. Cl. ................... 123/509; 137/565.34; 180/219
(58) Field of Search ............................. 123/509, 510, 123/514; 180/219; 280/834, 835; 137/565.34, 574, 565.17

(56) References Cited

U.S. PATENT DOCUMENTS 4,830,134 A * 5/1989 Hashimoto ............... 180/219
4,871,041 A * 10/1989 Saito et al. ............... 180/219
5,078,169 A * 1/1992 Scheurenbrand et al. ... 137/574
5,797,377 A * 8/1998 Fischerkeller ............ 123/514
6,182,640 B1 * 2/2001 Nakashima et al. ....... 123/516
6,253,790 B1 * 7/2001 Hara .................... 137/565.17
6,357,424 B1 * 3/2002 Sonoda et al. ........... 123/509
6,401,750 B2 * 6/2002 Tokunaga .............. 137/565.34

FOREIGN PATENT DOCUMENTS

JP          1193794          6/1999

* cited by examiner

Primary Examiner—Carl S. Miller
(74) Attorney, Agent, or Firm—Birch, Stewart, Kolasch & Birch, LLP

(57) ABSTRACT

A fuel supply system for a vehicle is provided with a fuel pump disposed in a fuel tank sitting astride a vehicle body frame. The fuel pump is disposed along a side surface of the fuel tank in a position opposed to a portion of the vehicle body frame. This fuel supply system for a vehicle provides a system in which a fuel pump can be disposed even in a fuel tank of a saddle-ridden vehicle with minimum modifications required in size and shape.

15 Claims, 6 Drawing Sheets

FUEL SUPPLY SYSTEM FOR VEHICLE

BACKGROUND OF THE INVENTION

CROSS-REFERENCES TO RELATED APPLICATIONS

This nonprovisional application claims priority under 35 U.S.C. §119(a) on Patent Application No. 2000-299228 filed in Japan on Sep. 29, 2000, the entirety of which is herein incorporated by reference.

1. Field of the Invention

The present invention relates to a fuel supply system for a vehicle, and more particularly to a fuel supply system for a vehicle having a fuel pump for press-sending a fuel.

2. Description of the Background Art

A conventional fuel supply system for a vehicle has a fuel pump for supplying a fuel to an internal combustion engine. The fuel pump is disposed in a fuel tank mounted on a vehicle body frame to effectively utilize a space around the vehicle body frame. Such a fuel supply system is disclosed in Japanese Unexamined Patent Publication No. 11-93794. This fuel supply system is applied to a motorcycle in which a fuel pump is mounted in a fuel tank by securing a flange for mounting the fuel pump to a flat portion of the fuel tank.

However, the present inventors believe that the aforementioned fuel supply system suffers from the following problems. When the foregoing fuel supply system is applied to a saddle-type vehicle in which a fuel tank is mounted on a vehicle body frame in such a way that it sits astride a vehicle body frame in the direction of the width of a vehicle body, prospective fuel pump positions is limited. The position where a flange can be secured for mounting a fuel pump is limited to only the bottom surfaces along both sides of the vehicle body frame. Accordingly, the portion where the fuel tank is mounted is widened in the direction of width to increase the size of the fuel tank.

In order to avoid such a problem, the fuel pump could be mounted on a flat portion along a center portion of the fuel tank with respect to the direction of the width of the fuel tank. However, the center portion of the fuel tank is positioned above the vehicle body frame. If the fuel pump is mounted at this position, the top surface of the fuel pump needs to be elevated so as to avoid any interference with the operation of the fuel pump. Accordingly, the total height of the fuel tank would have to be increased to accommodate this change.

SUMMARY OF THE INVENTION

The present invention overcomes the shortcomings associated with the background art and achieves other advantages not realized by the background art.

An object of the present invention is to provide a fuel supply system for a vehicle in which a fuel pump can be mounted even in a saddle-type vehicle's fuel tank with minimum modifications in size and shape.

These and other objects are accomplished by a fuel supply system for a vehicle, the system comprising a fuel tank positioned astride a vehicle body frame, the fuel tank having a side surface, a bottom surface and a top surface; a fuel pump disposed within the fuel tank, wherein the fuel pump is positioned along the side surface of the fuel tank and opposed to the vehicle body frame.

These and other objects are further accomplished by a saddle ridden vehicle including a vehicle body frame, a front fork mounted to a front portion of the vehicle body frame, a front wheel rotatably mounted on a lower portion of the front fork, a rear wheel rotatably mounted on an oscillating end of a rear fork, an engine, a main frame pipe disposed at a center of a top portion of the vehicle body frame, a vehicle saddle seat, and a fuel supply system, the fuel supply system comprising a fuel tank positioned astride the main frame pipe of the vehicle body frame, the fuel tank having at least a side surface, a bottom surface and a top surface; and a fuel pump disposed within the fuel tank, wherein the fuel pump is positioned along the side surface of the fuel tank and opposed to the vehicle body frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
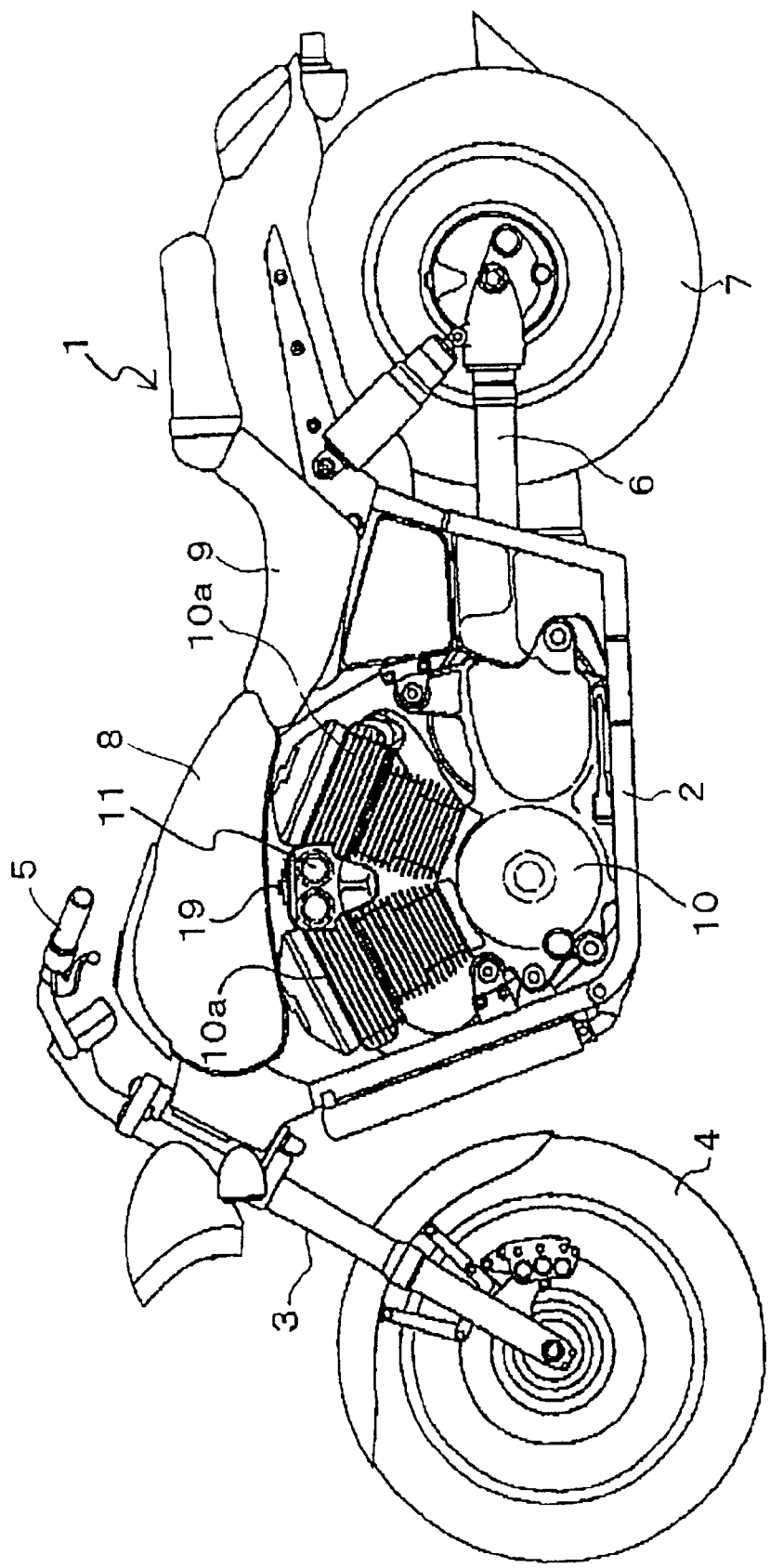
FIG. 1 is a side view of a motorcycle according to an embodiment of the present invention.
Figure 2:
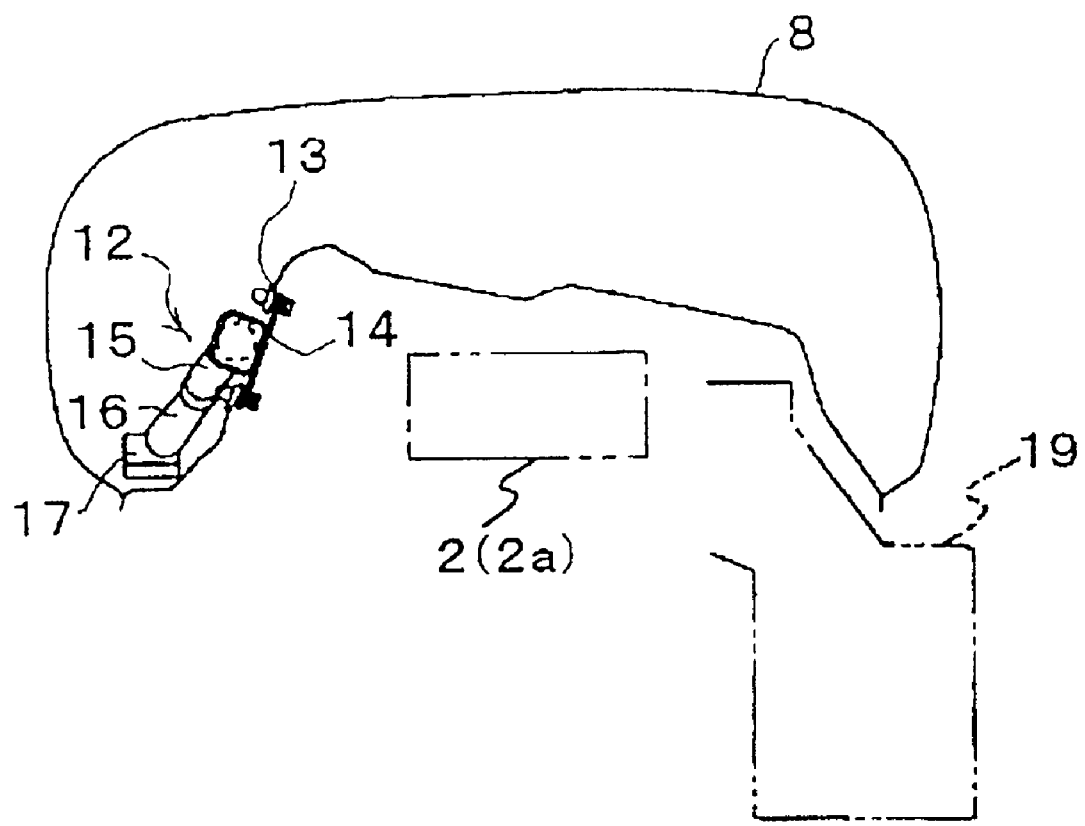
FIG. 2 is a longitudinal cross-sectional view of portion of a motorcycle according to an embodiment of the present invention.
Figure 3:
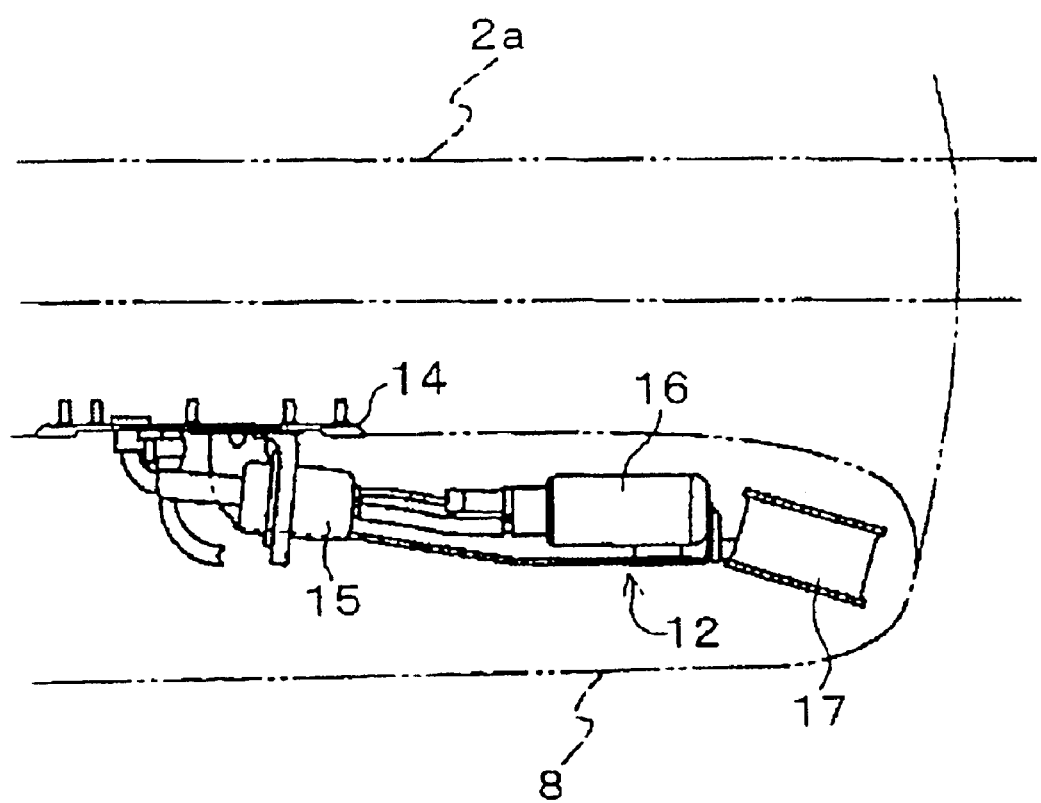
FIG. 3 is a plan view of a portion of a motorcycle according to an embodiment the present invention.
Figure 4:
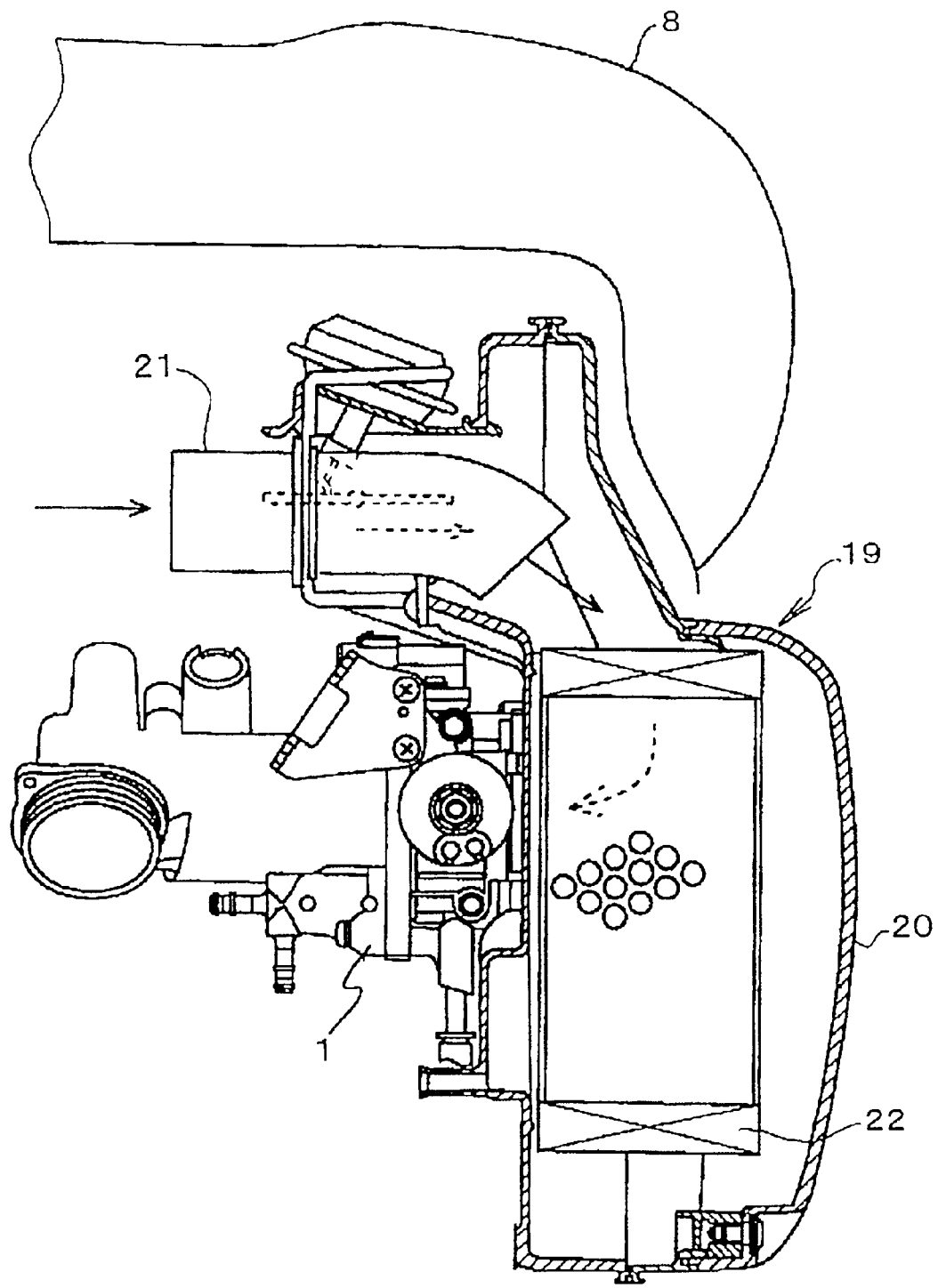
FIG. 4 is a longitudinal cross-sectional view of a portion of a motorcycle according to an embodiment of the present invention.
Figure 5:
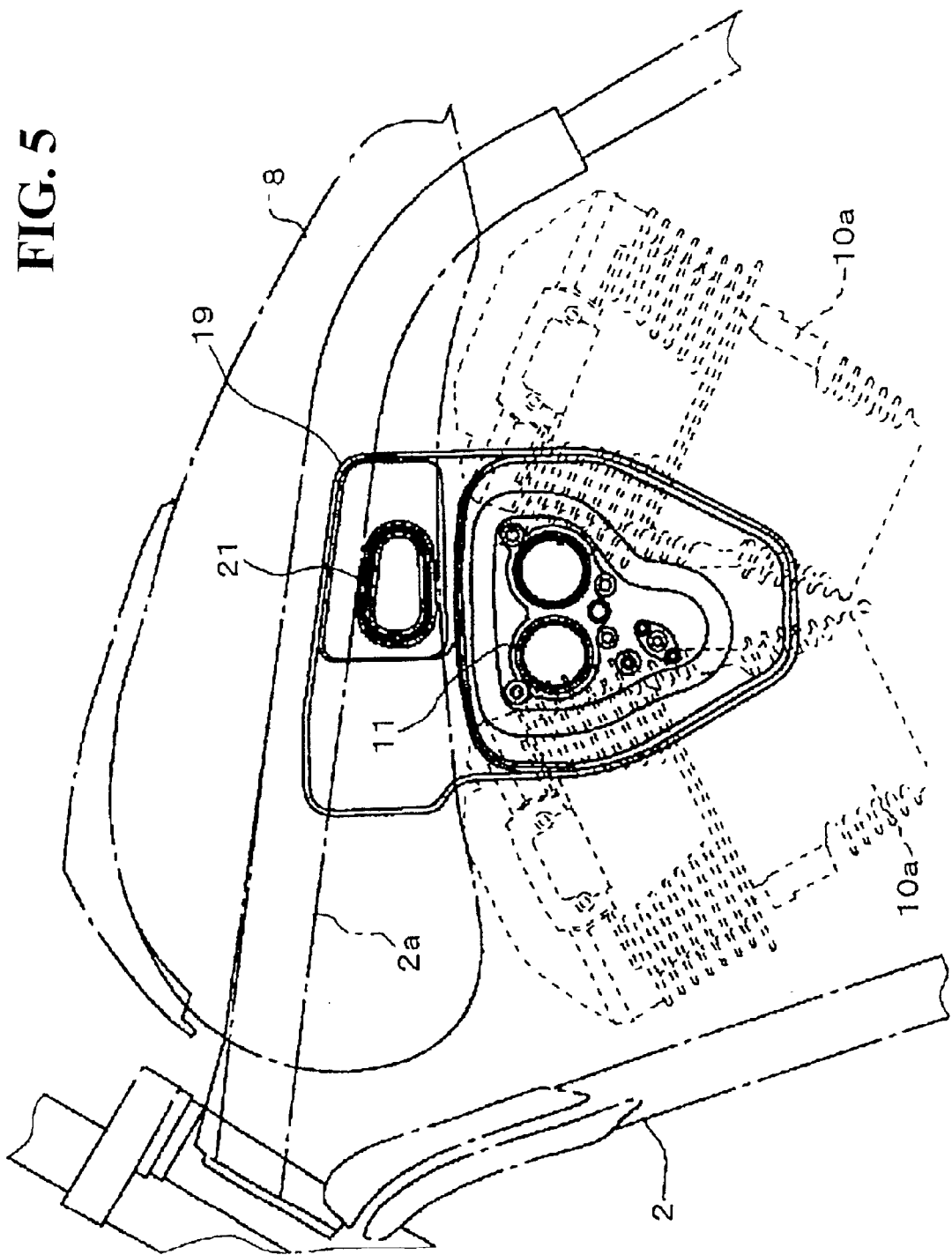
FIG. 5 is a side view of a portion of a motorcycle according to an embodiment of the present invention.
Figure 6:
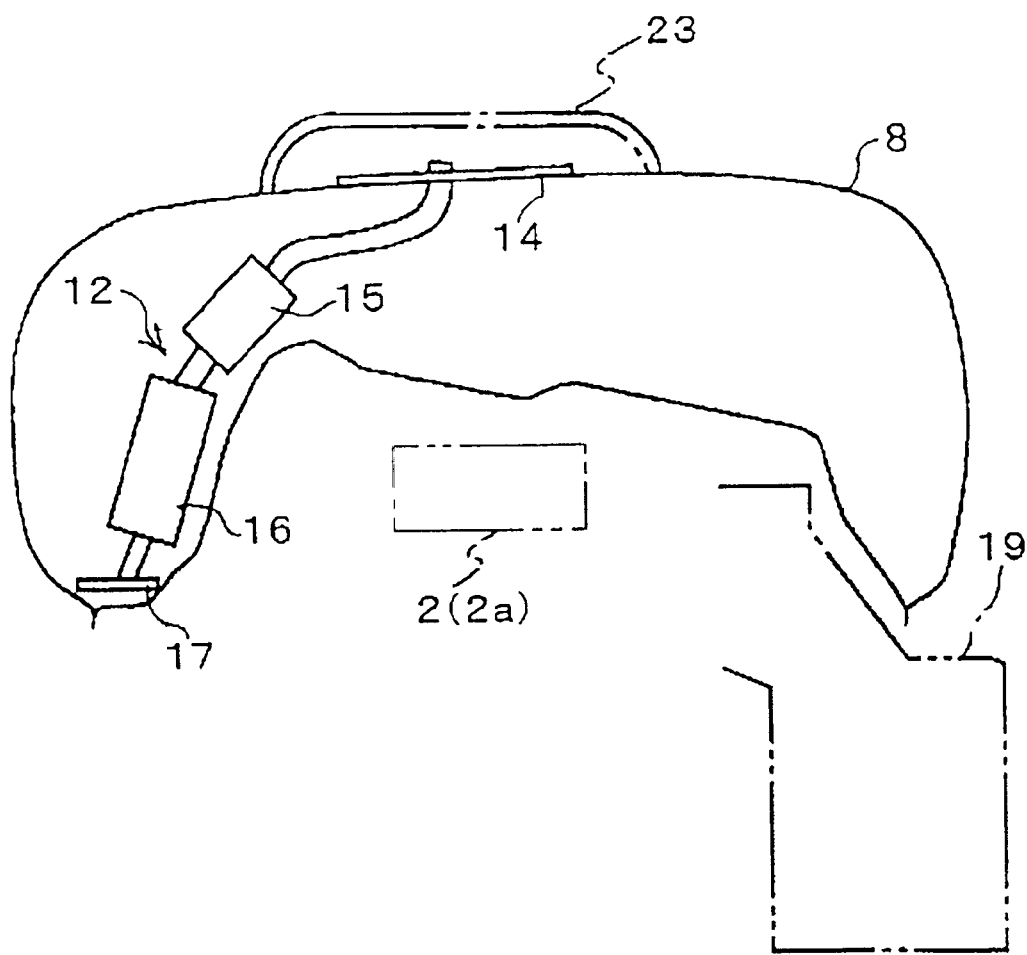
FIG. 6 is a longitudinal cross-sectional view of a portion of a motorcycle according to an embodiment of the present invention.

The present invention will described hereinafter with reference to the accompanying drawings. FIG. 1 is a side view of a motorcycle according to an embodiment of the present invention. FIG. 2 is a longitudinal cross-sectional view of portion of a motorcycle according to an embodiment of the present invention. FIG. 3 is a plan view of a portion of a motorcycle according to an embodiment the present invention. FIG. 4 is a longitudinal cross-sectional view of a portion of a motorcycle according to an embodiment of the present invention. FIG. 5 is a side view of a portion of a motorcycle according to an embodiment of the present invention. FIG. 6 is a longitudinal cross-sectional view of a portion of a motorcycle according to an embodiment of the present invention.

In FIG. 1, a motorcycle 1 includes a vehicle body frame 2, a front fork 3 mounted to a front portion of the vehicle body frame 2, a front wheel 4 rotatably mounted on a lower portion of the front fork 3, and a steering handlebar 5 mounted on an upper portion of the front fork 3. A rear fork 6 is mounted on the lower rear portion of the vehicle body frame 2. A rear wheel 7 is rotatably mounted on an oscillating end portion of the rear fork 6.

A fuel tank 8 is mounted on the upper portion of the vehicle body frame 2 at the back of the steering handlebar 5, and a seat 9 is mounted at a rear end of the fuel tank 8. An engine 10 is mounted on the vehicle body frame 2 in a position underneath the fuel tank 8. A throttle body 11 is mounted in the space between the engine 10 and the fuel tank 8.

The fuel tank 8, as shown in FIG. 2, is a fuel tank for a saddle-type vehicle that sits astride a main pipe 2a disposed at the center (with respect to the width of the vehicle body) of a top portion of the vehicle body of the vehicle body frame 2. A fuel supply system 12 in accordance with the present preferred embodiment is mounted in the portion positioned on the left side of the vehicle body frame 2 in this fuel tank 8.

The fuel supply system 12 is mounted on the inside surface of the fuel tank 8 at the side surface opposed to the main pipe 2a of the vehicle body frame 2. Further describing it in detail, a ring-shaped mounting flange 13 passing through the fuel tank 8 is integrally mounted on the inside surface of the fuel tank 8 at a side surface opposed to the main pipe 2a of the vehicle body frame 2.

The fuel supply system 12, as shown in FIG. 3, is provided with a base plate 14 mounted on the mounting flange 13 so that it covers a center opening of the mounting flange 13. The fuel supply system also includes a strainer 15 fixed to the base plate 14, a fuel pump 16 connected to the strainer 15, and a fuel filter 17 connected to the fuel pump 16. These members are disposed in the fuel tank 8 in positions extending from the base plate 14 toward the lower rear portion of the vehicle body. The fuel supply system 12 disposed in this manner is connected to the throttle body 11 via a fuel pipe connected to the outside surface of the base plate 14.

Further, as shown in FIG. 2 and FIG. 4, an air cleaner 19 for cleaning air for combustion supplied to the engine 10 is provided under the right side portion of the fuel tank 8 (under a portion of the side opposite to the side where the fuel supply system 12 is disposed).

The air cleaner 19, as shown in FIG. 4 and FIG. 5, includes an air cleaner case 20, an air duct 21 disposed from the top portion of the air cleaner case 20 toward the inside of the vehicle body, and an air filter 22 mounted in the air cleaner case 20. The throttle body 11 is mounted on the inside surface of the vehicle body of the air cleaner 20 and communicates with the air filter 22. The throttle body 11, as shown in FIG. 1 and FIG. 5, is disposed between two cylinders 10a mounted on the front and rear sides of the engine 10 and is connected to the respective cylinders 10a by suction pipes (not shown).

In the fuel supply system 12 of the present preferred embodiments, the fuel pump 16 is disposed along the side surface opposed to the vehicle body frame 2 in the fuel tank 8. The base plate 14 for mounting the fuel pump 16 on the fuel tank 8 can be mounted on the side surface that provides a sufficient space in the vertical direction. Therefore, even if a fuel tank 8 is for a saddle-type vehicle, the fuel tank 8 can be mounted without increasing its size in the directions of width and height as was typically required of the background art.

In this connection, the shapes and sizes of the constituent members shown in the preferred embodiment are examples and can be variously modified based on design requirements. For example, while the base plate 14 is mounted on the side surface opposed to the vehicle body frame 2 of the fuel tank 8 in the preferred embodiment described above, as shown in FIG. 6, the base plate 14 may be mounted on the top surface of the fuel tank 8. In this case, a tank cover 23 is mounted on the surface of the top portion of the fuel tank 8 to cover the base plate 14.

Even if the present invention is applied to a fuel tank for a saddle-type vehicle, such as an all terrain vehicle or motorcycle, a fuel supply system can be mounted on the side surface or the top surface of the fuel tank, which can prevent the fuel tank from increasing in size.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel supply system for a vehicle, the system comprising:
   a fuel tank positioned astride a vehicle body frame support member, said fuel tank having a side surface, a bottom surface and a top surface, wherein said fuel tank is shaped to have a pair of bottom portions, said bottom surface and said side surface surrounding said vehicle body frame support member; and
   a fuel pump disposed within the fuel tank, wherein the fuel pump is positioned along the side surface of the fuel tank and in a position opposed to the vehicle body frame and above said pair of bottom portions.

2. The fuel supply system according to claim 1, further comprising a ring-shaped mounting flange passing through the fuel tank and integrally mounted at a position along an inside surface of the side surface of the fuel tank.

3. The fuel supply system according to claim 2, further comprising a base plate mounted on the mounting flange and covering a center opening of the mounting flange, said fuel pump connected to the base plate.

4. The fuel supply system according to claim 3, further comprising:
   a strainer fixed to the base plate, said fuel pump connected to the strainer, and
   a fuel filter connected to the fuel pump.

5. A saddle-ridden vehicle including a vehicle body frame, a front fork mounted to a front portion of the vehicle body frame, a front wheel rotatably mounted on a lower portion of the front fork, a rear wheel rotatably mounted on an oscillating end of a rear fork, an engine, a main frame pipe disposed at a center of a top portion of the vehicle body frame, a vehicle saddle seat, and a fuel supply system, said fuel supply system comprising:
   a fuel tank positioned astride the main frame pipe of the vehicle body frame, said fuel tank having at least a side surface, a bottom surface and a top surface; and
   a fuel pump disposed within the fuel tank, wherein the fuel pump is positioned along the side surface of the fuel tank and opposed to the main frame pipe of the vehicle body frame.

6. The saddle-ridden vehicle according to claim 5, further comprising a ring-shaped mounting flange passing through the fuel tank and integrally mounted at a position along an inside surface of the side surface of the fuel tank.

7. The saddle-ridden vehicle according to claim 6, the fuel supply system further comprising a base plate mounted on the mounting flange and covering a center opening of the mounting flange, said fuel pump connected to the base plate.

8. The saddle-ridden vehicle according to claim 7, the fuel supply system further comprising:
   a strainer fixed to the base plate, said fuel pump connected to the strainer, and
   a fuel filter connected to the fuel pump.

9. The saddle ridden vehicle according to claim 5, the vehicle comprising:
   an air cleaner for cleaning combustion air provided to said engine positioned underneath a right side portion of the fuel tank, said fuel supply system disposed along a left side portion of the fuel tank; and
   a throttle body connected to the fuel supply system via a fuel pipe connected to an outside surface of the base plate.

10. The saddle ridden vehicle according to claim 9, the air cleaner further including
    an air cleaner case,
    an air duct disposed from a top portion of the air cleaner case toward an interior of the vehicle body; and
    an air filter mounted within the air cleaner case.

11. The saddle-ridden vehicle according to claim 5, further comprising a mounting flange passing through the fuel tank and integrally mounted at a position along an inside surface of the top surface of the fuel tank.

12. The saddle-ridden vehicle according to claim 11, the fuel supply system further comprising a base plate mounted on the mounting flange and covering a center opening of the mounting flange, said fuel pump connected to the base plate.

13. The saddle-ridden vehicle according to claim 12, the fuel supply system further comprising:
    a strainer fixed to the base plate, said fuel pump connected to the strainer, and
    a fuel filter connected to the fuel pump.

14. The saddle-ridden vehicle according to claim 12, further comprising a tank cover mounted on the top surface of the fuel tank and covering said base plate.

15. A fuel supply system for a vehicle, the system comprising:
    a fuel tank positioned astride a main frame pipe of a vehicle body frame, said fuel tank having a saddle shape with an innermost side surface and an outermost side surface, a bottom surface and a top surface; and
    a fuel pump disposed within the fuel tank, wherein the fuel pump is positioned along the innermost side surface of the fuel tank and in a position opposed to the vehicle body frame.

* * * * *